(12) United States Patent
Brandsdal

(10) Patent No.: US 8,671,968 B2
(45) Date of Patent: Mar. 18, 2014

(54) DEVICE FOR PRESSURE TESTING OF PIPES

(75) Inventor: Viggo Brandsdal, Ytre Arna (NO)

(73) Assignee: TCO AS, Bergen (NO)

( * ) Notice: Subject to any disclaimer, the term of this patent is extended or adjusted under 35 U.S.C. 154(b) by 540 days.

(21) Appl. No.: 12/735,936

(22) PCT Filed: Mar. 16, 2009

(86) PCT No.: PCT/NO2009/000098
§ 371 (c)(1),
(2), (4) Date: Aug. 26, 2010

(87) PCT Pub. No.: WO2009/113877
PCT Pub. Date: Sep. 17, 2009

(65) Prior Publication Data
US 2011/0016963 A1 Jan. 27, 2011

(30) Foreign Application Priority Data
Mar. 14, 2008 (NO) .................................. 20081387

(51) Int. Cl.
*F16K 17/40* (2006.01)
*E21B 47/00* (2012.01)

(52) U.S. Cl.
USPC ...................... 137/71; 137/68.16; 166/250.01

(58) Field of Classification Search
USPC ............. 166/250.01, 250.17; 137/71, 115.06, 137/115.16
See application file for complete search history.

(56) References Cited

U.S. PATENT DOCUMENTS 6,059,038 A * 5/2000 Vick, Jr. ........................ 166/319

FOREIGN PATENT DOCUMENTS

| RU | 46296 | 6/2005 |
| SU | 1461879 | 2/1989 |

* cited by examiner

*Primary Examiner* — John Rivell
*Assistant Examiner* — Kevin Barss
(74) *Attorney, Agent, or Firm* — Francis C. Hand; Carella, Byrne, et al

(57) ABSTRACT

A device is described for combined fluid replacement and pressure testing in pipes with inaccessible end points. The device is characterized in that it is a two-piece circulation valve structure comprising: a first valve unit (4) comprising a seal element (1) which closes and opens depending on the dynamic fluid pressure through the valve, and a second valve unit (6) arranged to permanently close off the fluid flow when the pressure testing terminates. The first valve unit (4) comprises an elastic sealing ring (1) arranged to close against a seat in the valve unit in step with an increase in the fluid flow velocity through the valve, while the second valve unit is a casing (6) which is arranged inside the valve an closes when a pressure differential arises between a chamber (7) and the inside of the valve (4).

13 Claims, 6 Drawing Sheets

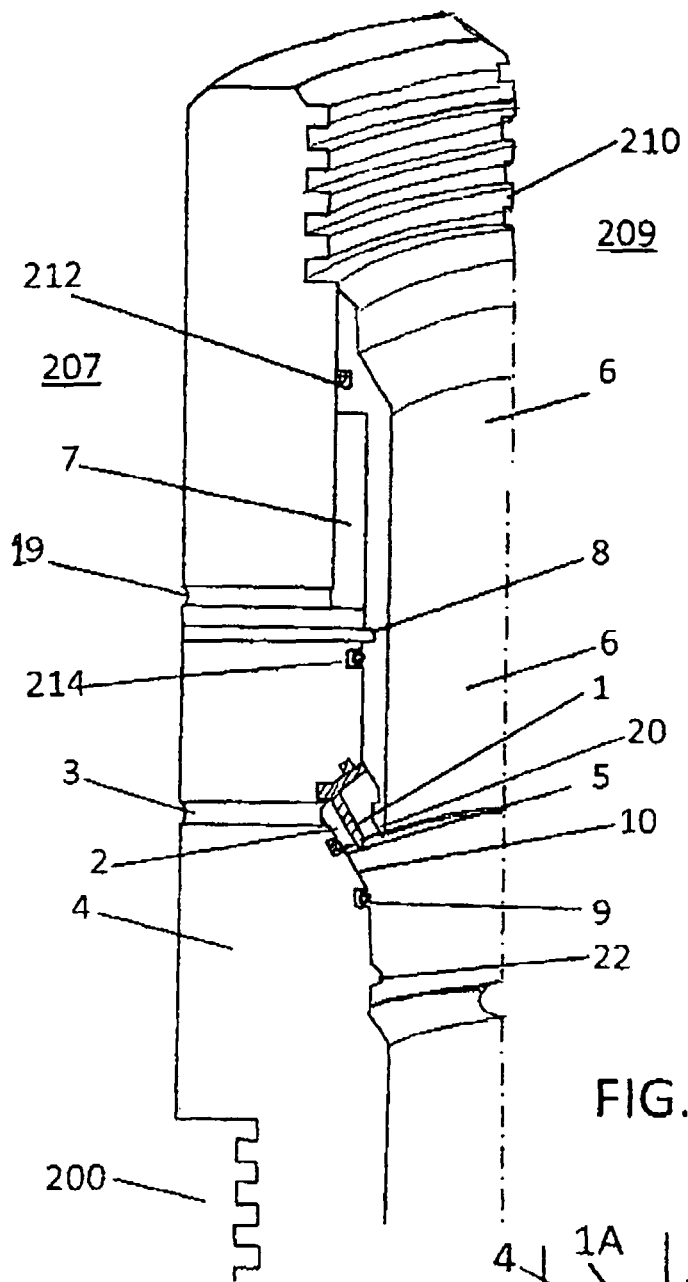
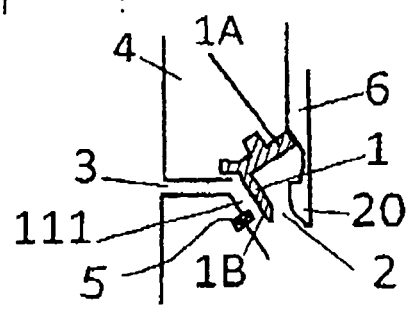
FIG. 2A
FIG. 2B

DEVICE FOR PRESSURE TESTING OF PIPES

The present invention relates to a device which permits flushing through with a fluid, replacement of fluid, and pressure testing of pipes with an inaccessible end point. As an example, production pipes which shall bring hydrocarbons from the ground and up to the surface in connection with production of oil and gas can be mentioned.

Mechanisms for solving such tasks are known and are based on pressure-operated pistons with adapted valves.

With regard to prior art, the aim of the invention is that the valve does not have mechanical gliding surfaces and normal piston chambers that constitute a risk for them being covered or being filled with deposits and particles so that the system loses its functionality. Prior art requires that such contamination shall not take place, something which leads to considerable problems for the user. According to prior art, flushing through with the purpose of cleaning the pipe is not permitted either.

The characteristics are obtained with regard to the invention in that the device is characterised in that the device is a two-piece circulation valve structure comprising:
- a first valve unit comprising a seal element which closes and opens depending on the dynamic fluid pressure through the valve, and
- a second valve unit arranged to permanently close off the fluid flow when the pressure testing is terminated.

According to a preferred embodiment, the sealing is an elastic sealing ring arranged to close against a seat in the valve unit in step with an increase in the velocity of the flow through the valve as a function of the dynamic drop in pressure between the elastic ring and its seat when a fluid flows through a recess and out through the one or more bore holes in the valve.

The device is shaped as a pipe part and is fitted on the pressure side of the inaccessible end of the pipe near to but over a such blind plug for or remotely controlled valve which is used for pressure testing of the production pipe. An elastic ring is arranged inside the device in a groove that runs around the internal circumference. Conduits or holes that lead to the outside of the device are arranged behind the recess/groove which is partially covered by said ring. The internal groove is formed such that the ring preferentially lies to the one side of the groove and as such leaves a recess between the ring and the groove on the opposite side. The fluid inside the pipe can now flow through the recess and out through the gates such that, for example, a new fluid can be circulated in, or the fluid can be filtered clean before the pipe is used again.

If the fluid flow is increased, a dynamic pressure reduction will arise in the recess as long as the direction of flow is from the inside of the pipe. This pressure reduction will force a change in the cross-section of the ring and make the recess narrower. If the fluid flow is increased further the ring will seal the recess completely. The sealing force increases with the pressure and permits repeated pressure tests.

To open the recess, the pressure inside the pipe must be reduced until it is the same as the pressure on the outside. In addition, recesses and gates can be washed by circulation in the opposite direction.

One can also install the lip to seal during circulation from the outside by turning the inside of the pipe out and retaining the same profile. The lip will have the exact same function as if one circulates by pumps from the outside of the pipe and into the pipe. If there is a need to duplicate the closing function, several rings are used in series.

In the function described above, the elastic ring is fitted inside the valve and will close off fluid flow from the inside to the outside. The same function can be obtained for the flow direction from the outside to the inside by fitting everything inverted on the outside. The lip will then close against a corresponding seat by flow from the outside of the valve into the pipe. This can then be tested from the outside.

To close the device permanently, a casing is arranged inside with the required packing units suspended on a shear pin so that it does not close fluid flow before it is required.

After the production pipe test period is terminated, there is provided fluid flow from the hydrocarbon formation 100 and into the production pipe, for example by perforating the production pipe 13 wall at appropriate positions in the formation 100.

The invention will be further explained in detail with reference to the appended drawings, in which:

FIG. 2A shows a vertical partial section of a preferred embodiment of the two-piece circulation valve structure of the present invention, i.e. a ring-shaped elastic valve element and an internal coaxial internal sliding stop valve element.

FIG. 2B shows an enlargement of the recess area wherein the elastic valve element 1 is anchored.

Figure 1:
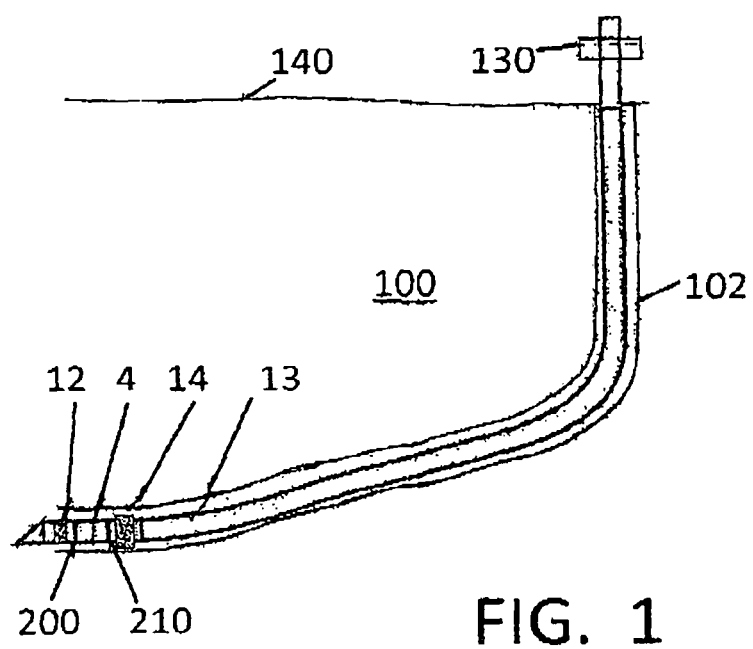
FIG. 1 shows a diagram of an example of an area of the application of the present invention.

Referring to the above drawing figures, FIG. 1 shows the application area of the present invention.

A hydrocarbon formation 100 is penetrated by a well 102 to bring the hydrocarbons to the surface 140 for further utilization. An installation to handle the hydrocarbons at the surface is shown at 130. A hydrocarbon production pipe 13 is arranged through the well 102. The end section of the production pipe 13 is closed by a blind plug 12 (establishing and representing the inaccessible end point). After the pressure testing has ceased, and the pipe internal sections has been flushed and cleaned, the pipe may be perforated adjacent to the hydrocarbon containing formation or formations, in order to allow for in-flow of hydrocarbons into the production pipe.

A circulation valve section 4 according to the invention is placed above said blind plug 12, and further into the well there is an external production packing 14 to seal the space between the production pipe and the external well wall.

The length or extent of the circulation valve section 4 is indicated by the lower and upper threaded connections 200 and 210, respectively, i.e. for inserting the circulation valve section 4 in between upper and lower production pipe sections.

The circulation valve of the invention is a two-piece structure. The first element is said elastic valve element 1, the position of which is altered by the difference in pressure between the inner fluid flow conduit 209 (FIG. 2A) and the area 207 outside the valve. The second valve element is a slide casing 6 which is moved from its open position (FIG. 2A) and into a final closing position (FIG. 5).

FIG. 2A shows a partial vertical section through the circulation valve 4 in its open position.

The valve element 4 includes an internal recess 2 (an annular shaped seating area) in which a ring-shaped elastic valve element 1 is anchored. A number of conduits or openings 3 run from recess 2 (seating) and out through the wall of the valve element 4 to establish a fluid flow between the internal pipe section 209 and the external area 207 outside the pipe.

Figure 5:
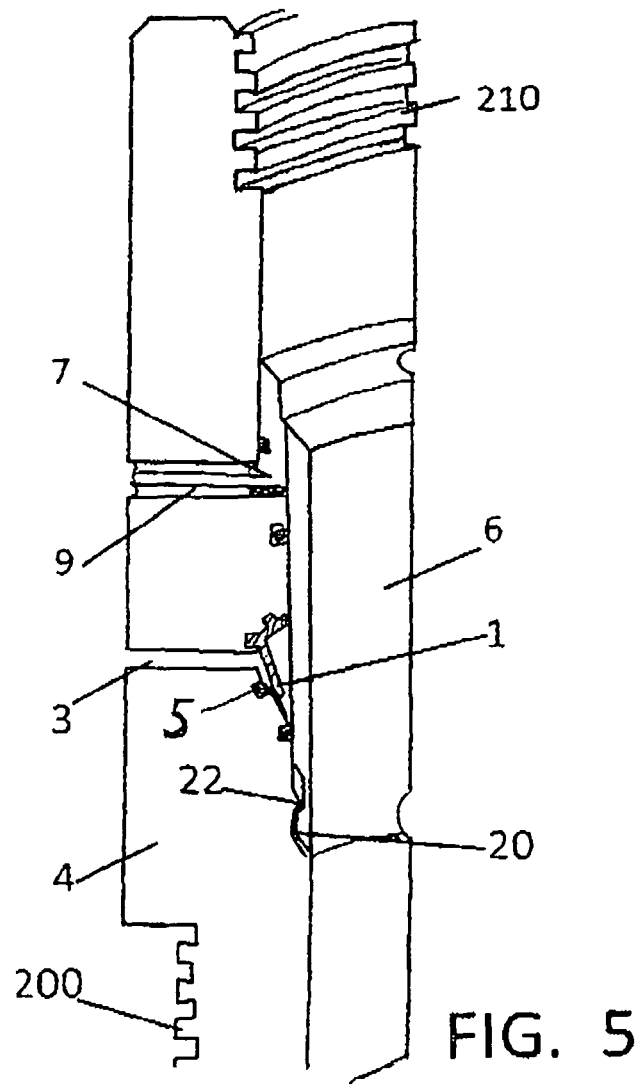
FIG. 5 shows final closing off position of the internal sliding stop valve element at its lower bound position.

Inside, according to a preferred embodiment, a permanent closure element including a coaxially internal mounted valve casing 6 may slide from an open fluid flow position (upper position) as shown in FIG. 2A, and into a permanent finally closed position (its lower position) as shown in FIG. 5. The slide casing is kept in its upper position by means of one or more shear pins 8.

A balanced annular pressure chamber 7 is structured between the outside of the ring shaped slide casing 6 and the internal wall of the valve element 4. The annular pressure chamber 7 is in fluid communication with the external side 207 (FIG. 2A) of the valve element 4 by means of conduits 19 through the wall of the valve element 4.

Due to the through-flow of fluid reaching a certain level, the elastic ring 1 is arranged to bend against a seal element, i.e. an O-ring 5 fitted in a seat 10 on the valve element 4.

Seal elements 212 and 214 (FIG. 2A) prevent any fluid flow leakage between the slide casing 6 and the internal wall of the valve element 4 and further through the conduits 3.

FIG. 2B shows an enlargement of the recess area wherein the elastic valve element 1 is anchored. In a preferred embodiment, the valve element 1 is designed by first 1A and second 1B legs, which are right-angled in respect of each other. The first leg 1A is anchored in the wall of the valve element 4, while the second leg 1B is arranged to pivot (freely) between opened position (shown in FIG. 2A) enabling fluid flow in a passage 111 between the leg 1B valve wall, and further through conduits 3, and a closed position (shown in FIG. 4) closing off said fluid flow.

The elastic valve element is preferably made of a rubber, plastic or metallic material of sufficient thickness to maintain the flexibility of the element. It may for example be a steel plate or sheet metal.

Figure 3:
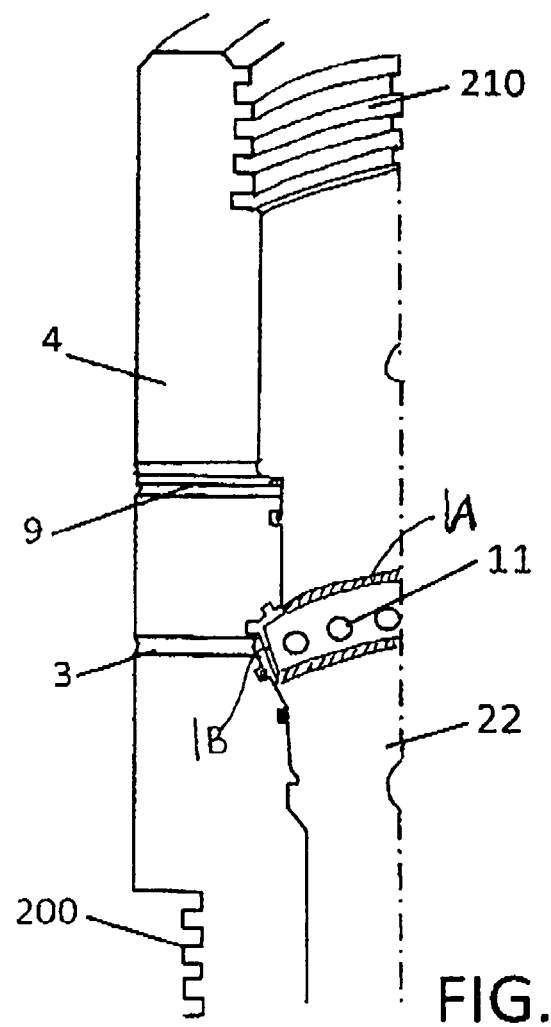
FIG. 3 shows the circulation valve structure of FIG. 2 where the internal sliding stop valve element is omitted.

FIG. 3 shows a perspective section through the circulation valve 4 with the elastic sealing flap ring 1 bent to its closed position in that the internal slide element 6 is omitted. The openings 11 run from the bottom/the end of the annular recess 2 (forming the seat) behind the elastic sealing ring 1 through the conduits 3 out to the external area of the valve element 4.

Figure 4:
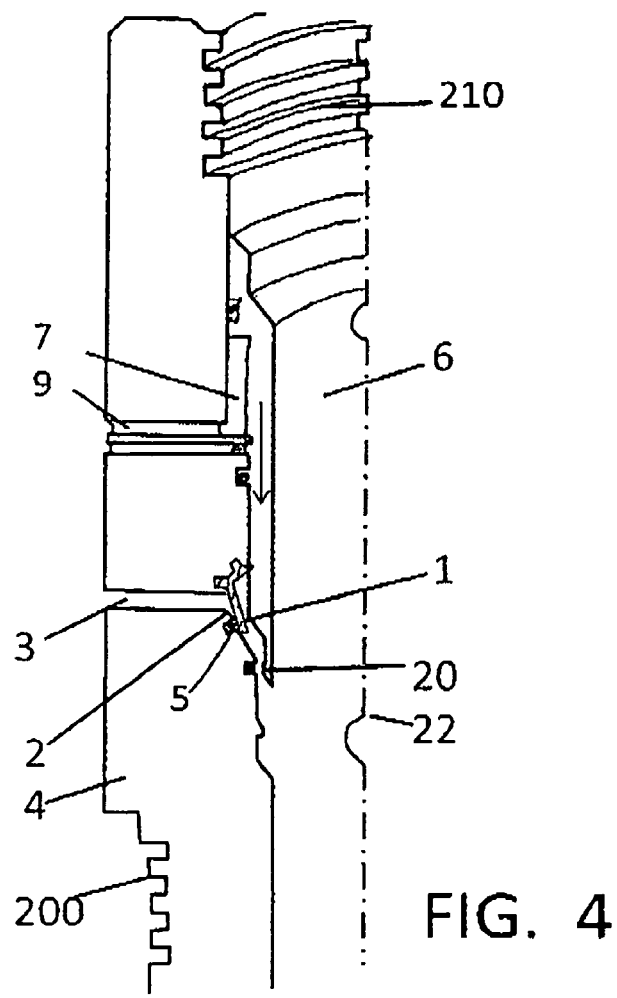
FIG. 4 shows vertical partial section similar to that of FIG. 2, showing the intermediate position of the internal sliding stop valve element on its downward movement to a position to shut off the fluid flow through the valve.

FIG. 4 shows a partial perspective view of the circulation valve 4 with the elastic ring 1 bent to its closed position resting against the seal element 5 (the O-ring).The slide casing 6 is, due to a reduced pressure in chamber 7, about to close permanently by sliding down inside the valve 4.

The slide casing 6 a lower outwardly extending ring-formed, flange-formed shoulder section 20, arranged to be pressed over an outwardly extending, protrusion/peg section 22 of the inner wall of the valve element 4 so that the casing 6 is permanently locked in place. The slide casing 6 can not glide back and is permanently looked below the peg 22.

FIG. 5 shows a perspective section through the circulation valve 4 with the elastic ring 1 in closed position and also the slide casing 6 has been moved downwards to its closed position.

Figure 6:
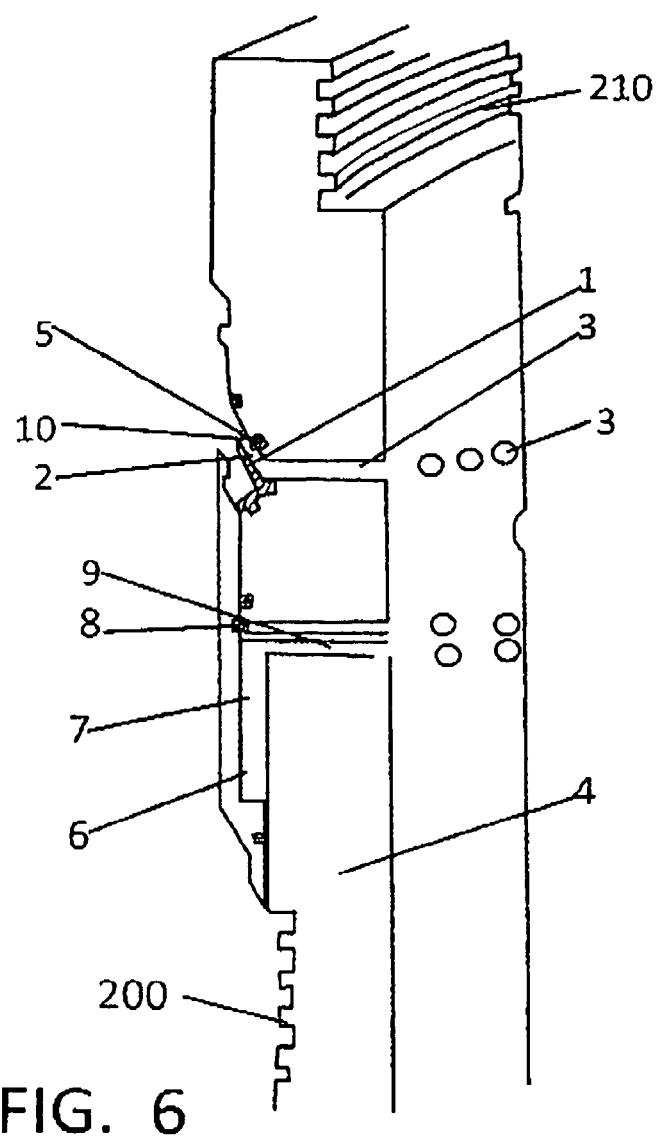
FIG. 6 shows another preferred embodiment, where the two-piece circulation valve structure of the present invention, where said structure is positioned enclosing or encircling the valve main structure.

FIG. 6 shows a perspective section through an inverted circulation valve which will close by effect of a fluid pressure from the outside towards the inside of the production pipe. In this embodiment the two-piece valve is arranged to enclose the circulation valve element.

The replacement of the fluid takes place at low flow where the fluid flows down through the pipe to a blind plug 12 where the device 4 is placed. Here, the fluid flows out of the pipe 13 through the recess 2 and thereafter through the holes 3 of the channel, where the one side of the seat includes a flexible sealing ring 1. By increasing the flow velocity of the fluid, said flap ring 1 will change its form by bending and against seal 5, and seal the recess 2 (seat area) so that the flow of fluid through the conduits 3 stops. Then a pressure test can be carried out.

When the pressure testing (for example, at about 100 bar) is completed, the flap seal element 1 will again open for fluid flow through the conduits 3. When there is a need for a new pressure testing, for example, the pressure is increased once more in the same manner, and the flap sealing ring 1 will close off any fluid flow to the outside through conduits 3.

When all such testing has been completed, one wishes to close the channel with a more permanent appliance. Then the slide casing 6 is actuated as follows: At higher pressures, the flap seal element 1 closes as normal. If the pressure is increased further, for example, up towards 300 bar, the casing 6 is pushed downwardly, also assisted by a lower (below 100 bar) external pressure in the annular space/channel 7 via the conduits 9). Then, the shear pins 8 break and the annular casing 6 slides over the sealing ring element 1, presses this radially outwards (towards the wall) to close the channels 3.

The lower, circumferentially outwardly extending ring-formed, flange-formed shoulder section 20 of the casing is pressed over the outwardly extending, i.e. opposite ring-formed, flange-formed directed protrusion/peg section 22 of the inner wall so that the casing is permanently locked in place.

Then the slide casing cannot glide back and re-open the conduits/channels 3. The shoulder 20 is then positioned permanently locked below the peg 22.

The mode of operation of the invention allows for a high reliability even with varying temperatures and a considerable content of contaminating material in the fluid.

In addtion to conducting the test procedure of the pipe, the two piece valve system according to the invention may by used to flush and clean the piston chambers and surfaces being covered and filled with deposits and to reduce the risk for them to lose their functionality. Such deposits may be flushed out of the pipe through the opening of the pipe wall. Prior art requires that such contamination shall not take place, something which leads to considerable problems for the user.

The invention claimed is:

1. Device for combined fluid replacement and pressure testing in pipes with inaccessible end points, characterised in that the device is a two-piece circulation valve structure comprising:
   a first valve unit comprising an elastic sealing ring which closes and opens depending on the dynamic fluid pressure through the valve, said elastic sealing ring arranged in a recess to close against a seat in the valve unit in step with an increase in the fluid flow velocity through the valve as a function of the dynamic drop in fluid pressure between said elastic sealing ring and said seat when a fluid flows through a recess and out through one or more fluid conduits in the valve unit, said elastic sealing ring having a shape that ensures that the reduction of pressure as a consequence of the velocity of the fluid leads to the cross-section of said sealing ring being altered to seal against said seat and an O-ring therein; and
   a second valve unit arranged to permanently close off the fluid flow when the pressure testing is terminated.

2. Device according to claim 1 wherein said recess is a groove that runs around the internal circumference, with at least one opening that leads to the outside of the device being arranged in communication with said groove which is partially covered by said ring.

3. Device according to claim 1 characterised in that said second valve unit is a casing arranged inside the valve that closes when a pressure differential arises between a chamber and the inside of the valve.

4. Device according to claim 3 characterised in that an opening between two O-rings lets in/out pressure from the chamber through the valve and to the outside of the valve.

5. Device according to claim 3 characterised in that a shear pin is arranged to keep the casing in place under repeated openings and closings of the elastic ring but to break if the internal pressure is increased above a predetermined pressure in that the differential pressure between the chamber and internally in the valve becomes of such a magnitude that the force that influences said casing will now increase to a level where said shear pin is broken.

6. Device according claim 1 characterised in that said first and second valve units are positioned enclosing or encircling the valve main structure, so that the valve operates and closes off the fluid flow from the external side of the unit.

7. Device according to claim 1 characterised in that the device comprises a plurality of flexible first valve units rings after each other in the valve to achieve a desired amount of through-flow before the permanent closure by means of said second valve unit.

8. Device according to claim 1 characterised in that a first leg of the elastic sealing ring is anchored to one side of said recess while a second leg is arranged to pivot freely and defines a passage between said second leg and the groove wall, whereby the fluid inside the pipe can flow through said passage and out through an opening that leads to the outside of the device so that a new fluid can be circulated in or the fluid can be filtered clean before the pipe is used again.

9. Device according to claim 1 characterised in that said elastic sealing ring-is made of one of a rubber, plastic or metallic material.

10. A two-piece valve structure for insertion between production pipe sections, said valve structure comprising
an annular valve element including an internal annular recess and at least one conduit having an opening in and extending from said recess to an exterior of said valve element;
an elastic sealing ring mounted in said recess of said valve element to close and open depending on the dynamic fluid pressure within said valve element, said sealing ring having a leg spaced from said opening in said recess to define a passage for a flow of fluid from within said valve element to the exterior of said valve element, said leg being pivotable in response to a fluid pressure within said valve element being greater than a pressure external to said valve element from an open position spaced from said opening of said conduit to a closed position in sealed relation over said opening of said conduit;
an annular seal ring in said annular valve element wherein said leg of said sealing ring rests against said seal ring in said closed position thereof; and
an annular casing slidably mounted within said valve element for sliding between an open fluid flow position to permit a flow of fluid from within said valve element to the exterior of said valve element through said conduit and a closed position to block a flow of fluid from within said valve element to the exterior of said valve element through said conduit.

11. A two-piece valve structure as set forth in claim 10 wherein said elastic sealing ring is of L-shape with a second leg secured in said valve element.

12. A two-piece valve structure as set forth in claim 10 wherein said annular recess is directly open to the interior of said valve element to permit fluid within said valve element to act directly on said leg of said sealing ring.

13. A two-piece valve structure as set forth in claim 10 wherein annular casing is movable from said open fluid position to said closed position in response to a predetermined increased fluid pressure within said valve element.

* * * * *